Feb. 18, 1947.  J. B. MILLER  2,415,959
PORTABLE VULCANIZER
Filed March 31, 1943  2 Sheets-Sheet 1
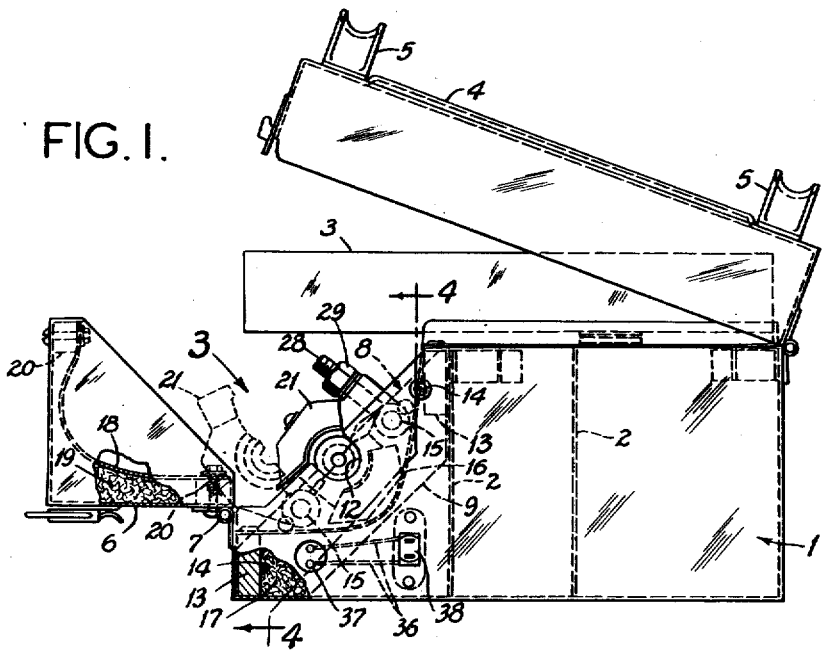
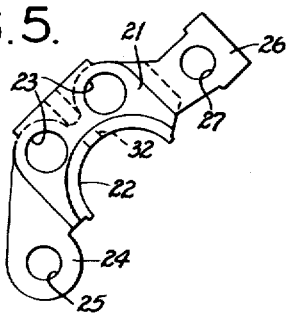
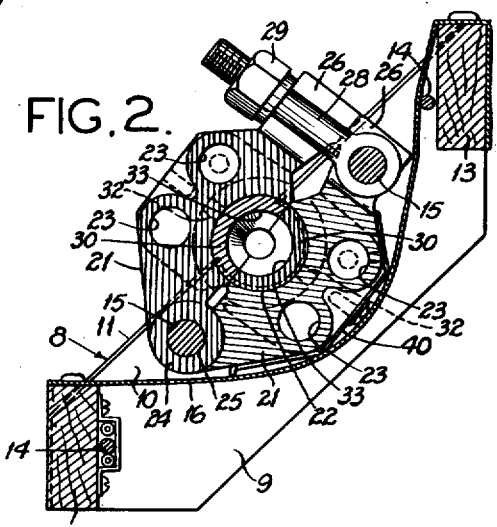
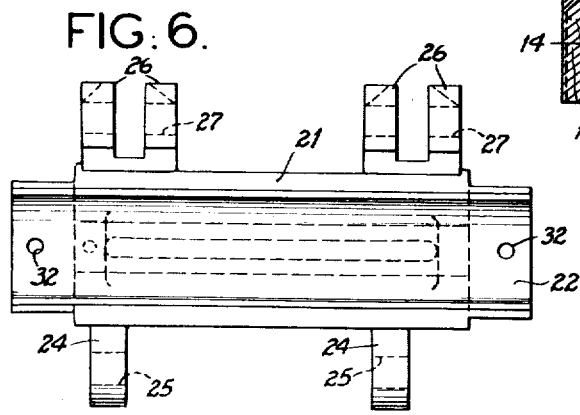
INVENTOR;
JAMES B. MILLER
ATTORNEYS Feb. 18, 1947.  J. B. MILLER  2,415,959
PORTABLE VULCANIZER
Filed March 31, 1943  2 Sheets-Sheet 2
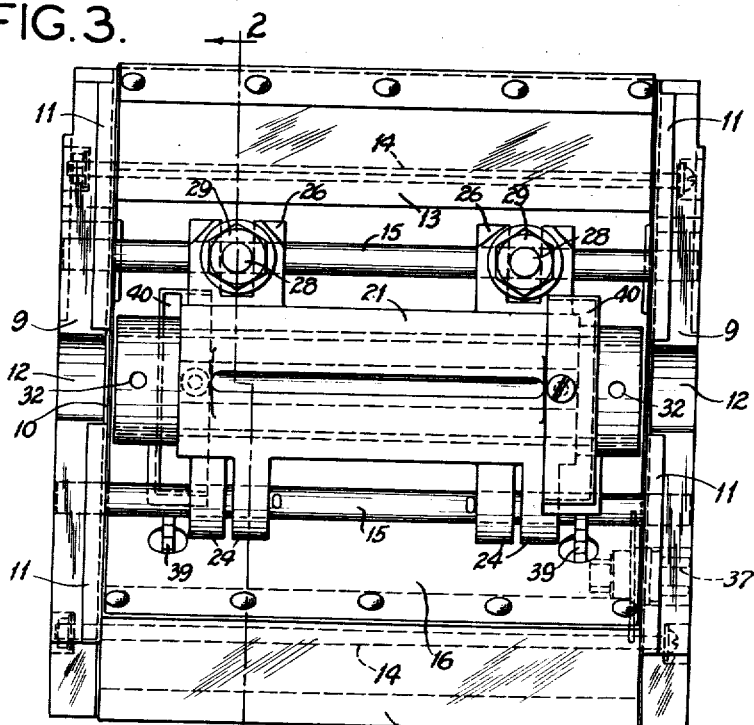
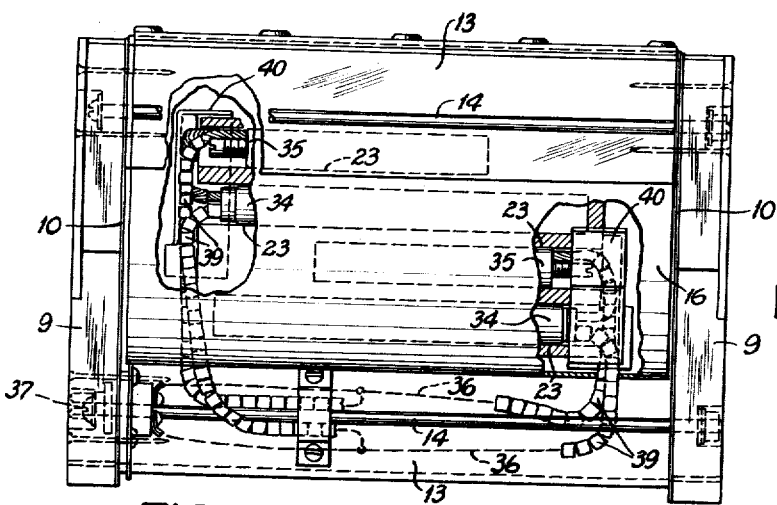
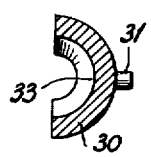
INVENTOR;
JAMES B. MILLER
BY
ATTORNEYS Patented Feb. 18, 1947

2,415,959

UNITED STATES PATENT OFFICE 2,415,959

PORTABLE VULCANIZER

James B. Miller, Webster Groves, Mo., assignor to Mines Equipment Company, St. Louis, Mo., a corporation of Missouri Application March 31, 1943, Serial No. 481,229

9 Claims. (Cl. 18—6)

This invention pertains to vulcanizers, and more particularly to a portable vulcanizer designed for repairing electrical cables in the field, attaching plug-socket connections to such cables, and similar operations.

In maintaining communications between the different units of military forces, great reliance is placed upon electrical methods of communication, and, accordingly, the maintenance of circuits in the field constitutes an important part of the operations of the Signal Corps and similar units. Many of the devices used are equipped with rubber-covered cables having plug-socket connectors so that temporary circuits may be established in a minimum of time. Under war conditions, of course, such cable connections must be maintained in repair.

One of the objects of this invention, therefore, is to provide a field kit which is self-contained and organized in portable form so that it may be easily carried as military equipment and used in the field for vulcanizing operations.

Another object is to provide such a vulcanizing device which shall be rugged in construction so as to be capable of withstanding hard usage and which, at the same time, shall be efficient in operation.

Another object is to provide such equipment adapted for the use of interchangeable parts so that damaged parts may be easily replaced.

Another object is to provide a vulcanizer organized so that molds of different forms may be mounted therein so as to mold any desired type of cable connection, and also to provide for the use of interchangeable molds which may be quickly substituted one for another.

Further objects will appear from the following description, taken in connection with the accompanying drawings, in which:

Figure 1 is a side view of a complete vulcanizer field kit, including a vulcanizer embodying this invention.

Figure 2 is an enlarged section taken about on line 2—2 of Figure 3.

Figure 3 is an enlarged face view of the vulcanizer taken in the direction of the arrow numbered 3 in Figure 1.

Figure 4 is an enlarged rear view taken about on line 4—4 of Figure 1.

Figure 5 is an end view of one of the body members, shown in the position of the top member of Figure 2.

Figure 6 is an inside view of the member shown in Figure 5.

Figure 7 is a plan view of a mold section such as used in the vulcanizer of this invention, and Figure 8 is a section on line 8—8 of Figure 7.

Referring now to the drawings, 1 designates a carrying case, which is preferably made up in the form of a metallic box and may have partitions 2 dividing the same into compartments adapted to receive the extra mold sections, supplies of material, and the like. Mounted over the top of the compartments 2 is a removable tray 3 adapted to hold tools, small parts, and the like. A hinged cover 4 having carrying handles 5 is adapted to close the entire carrying case.

The end compartment of the case 1 has a lid 6 hinged at 7 at a point low on the end wall of the case 1. The side walls of the case 1 and of the lid 6 are arranged to separate along a sloping plane, indicated at 8. This provides access to the vulcanizer contained in the end compartment from both above and from the end, the lid 6 being capable of swinging on the hinge 7 to a position lower than that shown in Figure 1.

Within the end compartment of the case 1 two wooden side frames or cradles 9 are mounted against the opposite side walls of the compartment to provide supports for the vulcanizer. These cradles are preferably faced with a sheet metal facing 10 whose edges may be turned over the edges of the cradles 9, as shown at 11 in Figure 3. The cradles 9 are provided near their middle points with aligned semi-circular openings 12, and the opposite side walls of the end compartment are provided with openings registering with the openings 12. The cradles 9 are spaced apart by a pair of cross-strips 13 which may be secured to the cradles by nailing or otherwise, such securing means including retaining bolts 14. Supported in the cradles 9 and extending across the compartment between them is a pair of supporting rods 15 which are parallel to each other and spaced apart.

Secured to the cross-strips 13 and suspended so as to form a loop or pocket below the rods 15 is a flexible sheet 16 of asbestos, or similar material, providing a screen or curtain behind and below the vulcanizer which is to be described. The end compartment below the screen may be packed with thermal insulating material 17, such as glass wool or the like. The lid 6 is similarly provided with a screen or curtain 18 attached to cross-strips 20, and the space therebehind may also be packed with insulating material 19. These arrangements provide for insulating the vulcanizer thermally from the rest of the carrying case so as to protect the case and its contents from excessive heat and also to prevent waste of heat during the operation of the vulcanizer.

The vulcanizer itself comprises a body formed of complementary half-members, one of which is shown in end view at 21 in Figure 5 and in face view in Figure 6. Two such members are used in complementary relation, as will be described hereinafter. They may be of identical form and may be constructed of any suitable material. They may conveniently be cast out of cast iron. Each member comprises an elongated body formed on the inside with a semi-cylindrical cavity 22 extending the full length of the member. In the arrangement shown, this cavity is of uniform diameter throughout and is preferably finished to have a reasonably smooth inside surface. Running parallel with the cavity 22 are tunnels or sockets 23 adapted to receive heating units or the like. These tunnels, which are relatively long as compared to their width, may extend the full length of the member 21 or for only a part of that length, according to the circumstances. Each member 21 is provided on one side of the cavity 22 with one or more hinge lugs 24, which may be perforated with openings 25 adapted to receive one of the rods 15. Lugs 24 are preferably placed in non-symmetrical position with respect to the center-line of the member 21, so that the lugs of two complementary members when placed face-to-face will lie side-by-side.

The vulcanizer comprises two members 21 mounted in mutually facing relation, as shown in Figure 2, by passing the lower rod 15 through the openings 25 in the hinge lugs of both members. On the opposite side of the cavity 22, each member 21 is provided with two pairs of spaced lugs 26. These lugs are located so that when the two members are mounted on the rod 15, the lugs 26 of both members will be in alignment as shown in Figure 3. However, the lugs 26 of only one of the members may be drilled with aligned holes 27. The member so drilled is placed as the lower member in Figure 2, and the upper rod 15 is passed through the holes 27. By this arrangement the lower member 21 is fixedly mounted in the end compartment of the case 1, while the upper member is hinged thereto on the lower rod 15 so that it may be swung to open position with respect to the lower member, as indicated in dotted lines in Figure 1. Mounted on the upper rod 15 and between the lugs 26 of the lower member 21 are eye bolts 28 provided with compression nuts 29. These eye bolts are thus arranged to hinge on the upper rod 15 so that they may be swung into position between the lugs 26 of the upper member 21 when the latter is in closed position, as shown in Figure 2, and the nuts 29 may then be screwed down upon the lugs 26 so as to apply the necessary pressure during the molding operation.

In order to provide for molding the work to the desired shape, a pair of mold sections such as illustrated in Figures 7 and 8 are provided, adapted to be mounted in the cavities 22 of the vulcanizer body members. These mold sections, one of which is shown in Figures 7 and 8, each comprise a semi-cylindrical body 30 whose outside diameter is dimensioned to fit the cavity 22 of the vulcanizer member. Dowel pins 31 are provided on the mold sections 30 to fit corresponding holes 32 in the vulcanizer members so as to accurately locate the mold sections. Each of these sections 30 is formed with an inner recess 33 of any suitable shape or size. When the two sections 30, mounted in the two vulcanizer members 21, are brought together as shown in Figure 2, the recesses 33 cooperate to form a mold cavity within which the rubber part of the work operated on may be molded and vulcanized. While only one section 30 is illustrated, the invention contemplates the employment of a plurality of pairs or sets of such sections, providing mold cavities of different sizes and shapes such as to cover all of the different forms to be molded. These mold sections are interchangeable and any set may be placed in the members 21 to mold the desired form.

Mounted in the sockets or tunnels 23 are portable heating units 34. These are preferably electric heaters, as such devices may be made up in convenient form for insertion into the sockets 23. In these sockets also, or in one of them, thermostatic regulating devices 35 may be mounted and suitably connected to the circuit of the heating devices 34 to regulate the temperature of the vulcanizer members 21 so as to maintain that temperature constant at the desired value. Suitable connecting leads, indicated at 36, connect the heating units 34 and the regulators 35 to suitable attachment plugs or sockets on the outside of the carrying case 1. In Figure 1 two types of connectors are illustrated. At 37 is shown a connector of the plug type and at 38 one of the socket type. These are wired in parallel so that whatever type of supply connector may be available can be used to attach the vulcanizer to the supply circuit. The leads 36 may be insulated where they pass through the end compartment by means of beads 39, and a suitable protecting shield 40 may be provided where these leads enter the sockets 23.

In the use of this apparatus the cable connection, whether an ordinary cable splice or a connection to a terminal, or any other type of connection, is suitably wrapped with crude rubber or otherwise prepared for molding. The upper member 21 is then swung open on the lower rod 15, the pressure bolts 28 having first been disengaged. The upper vulcanizing member then takes the position shown in dotted lines in Figure 1. At this time, of course, the lid 4 is thrown back out of the way, and the tray 3 is removed. Access is thus provided to the interior of the mold cavity. A suitable pair of mold sections is selected and placed in the cavities 22. The splice is then placed in the lower mold cavity, with the cables extending through the recesses 12, and the upper mold is closed down thereon by hinging the upper member 21 and moving the same to the closed position shown in Figure 2. The pressure bolts are swung into place, and the nuts 29 are tightened down upon the lugs 26 so as to secure the two vulcanizer members together. The current has previously been supplied to the heating units 34 which operate to heat the members 21.

It will be noted that while operating in this way the complementary members 21 provide the cylindrical cavity 22 which forms a vulcanizing chamber, said chamber being lined by the mold sections 30, which provide the proper form for molding the work. The sections 30 are heated by the heat supplied through the vulcanizer members. As the operation progresses, the rubber is liquefied and molded to the form of the mold cavity and by the continued application of heat is vulcanized to the desired extent. In this way any cable connection, such as a splice, may be completely embedded in rubber, and suitably vulcanized so as to provide a thoroughly water-proof job.

As a considerable number of sets of mold sections 30 may be required for each kit, it has been found that a simple and economical method of manufacturing these sections is to mold them out of plastic material. A material which has been found very suitable is paper impregnated with thermo-setting material such as a phenolic resin of suitable type. The molding is carried out at a suitable temperature in pressure dies of the desired shapes. The resulting mold sections are accurately formed and strong and have sufficient heat conductivity to transfer the heat rapidly from the vulcanizer members to the work.

It will be seen, therefore, that this invention provides a simple and inexpensive apparatus whereby vulcanizing and molding operations may be carried out in the field. Any desired number of kits, such as illustrated in Figure 1, may be carried with a given military unit. The electric current for heating the vulcanizer may be obtained from local supplies or from generating equipment carried with the military unit.

While the apparatus has been described as a unitary device, it will be understood that individual features or sub-combinations thereof may be useful by themselves without reference to other features or the complete combination, and it is understood that the employment of such individual features or sub-combinations is contemplated by this invention when within the scope of the appended claims.

It is further obvious that various changes may be made in the details of construction within the scope of the appended claims without departing from the spirit of this invention, and that therefore the invention is not limited to the specific details shown and described.

The invention having thus been described, what is claimed is:

1. A portable vulcanizer of the character described, comprising, a carrying case having an end compartment, a vulcanizer having a vulcanizing chamber co-extensive therewith mounted in said compartment with said chamber extending across the compartment, and thermal insulation between the walls of said compartment and said vulcanizer, the walls of said compartment having openings therein opposite the ends of said chamber adapted to receive a cable extending from said chamber.

2. A portable vulcanizer of the character described, comprising, a carrying case having a base and a lid mounted to open along a sloping plane diagonally with respect to said base, a pair of complementary body members mounted in said case and formed for cooperation to provide a vulcanizing chamber, one of said members being hinged to the other for opening movement relative thereto and being separable therefrom at said plane to open said chamber, and portable heating means mounted in said body members operable to heat said chamber.

3. A portable vulcanizer of the character described, comprising, a carrying case having a lid mounted to open along a sloping plane, a pair of complementary body members mounted in said case and formed for cooperation to provide a vulcanizing chamber, one of said members being hinged to the other for opening movement relative thereto and being separable therefrom at said plane to open said chamber, portable heating means mounted in said body members operable to heat said chamber, and compression means for securing said members in closed relation.

4. A portable vulcanizer of the character described, comprising, a carrying case having a lid mounted to open along a sloping plane, a pair of complementary body members mounted in said case and formed for cooperation to provide a vulcanizing chamber, one of said members being hinged to the other for opening movement relative thereto and being separable therefrom at said plane to open said chamber, complementary mold sections mountable respectively in said members and separable therewith to provide an openable mold cavity, and portable heating means mounted in said body members operable to heat said chamber.

5. A portable vulcanizer of the character described, comprising, a carrying case having a lid mounted to open along a sloping plane diagonally with respect to said base, a pair of complementary body members mounted in said case and formed for cooperation to provide a vulcanizing chamber, one of said members being hinged to the other for opening movement relative thereto and being separable therefrom at said plane to open said chamber, and portable heating means and heat-regulating means mounted in said body members operable to heat said chamber to a constant temperature.

6. A portable vulcanizing kit of the character described, comprising, a carrying case having one or more compartments for receiving and storing vulcanizable materials and an end compartment, a vulcanizer mounted in said end compartment for vulcanizing operation therein, and heat-insulating partition means separating said end compartment from said material compartment.

7. A portable vulcanizing kit of the character described, comprising, a carrying case having one or more compartments for receiving and storing vulcanizable materials and an end compartment, a lid for said end compartment mounted to open along a sloping plane, a pair of complementary body members mounted in said end compartment and formed for cooperation to provide a vulcanizing chamber, one of said members being separable from the other along said plane to open said chamber, releasable compression means for securing said members in closed relation, heat-insulating partition means separating said end compartment from said material compartment, and portable heating means mounted in said body members operable to heat said chamber.

8. A portable vulcanizing kit of the character described, comprising, a carrying case having one or more compartments for receiving and storing vulcanizable materials and an end compartment, a lid for said end compartment mounted to open along a sloping plane, a pair of complementary body members mounted in said end compartment and formed for cooperation to provide a vulcanizing chamber, one of said members being separable from the other along said plane to open said chamber, complementary mold sections mountable respectively in said members and separable therewith to provide an openable mold cavity within said chamber, releasable compression means for securing said members in closed relation, heat-insulating partition means separating said end compartment from said material compartment, and portable heating means mounted in said body members operable to heat said chamber.

9. A portable vulcanizer of the character described, comprising, a carrying case having an end compartment, and a vulcanizer having a vulcanizing chamber co-extensive therewith mounted in said compartment with said chamber extending across the compartment, and having openings at its opposite ends, the walls of said compartment having openings therein opposite the end openings of said chamber and of substantially the same size as said end openings and in registry therewith, and adapted to receive a cable extending from said chamber, and said end walls of said compartment with the openings therein being located beyond the ends of said vulcanizing chamber, and the openings in said end walls being smaller than the ends of said vulcanizing chamber next adjacent thereto, whereby the walls protect the ends of the vulcanizing chamber, but leave unobstructed the said openings of the vulcanizing chamber.

JAMES B. MILLER.

REFERENCES CITED

The following references are of record in the file of this patent:

UNITED STATES PATENTS

| Number | Name | Date |
|---|---|---|
| 677,399 | Conklin | July 2, 1901 |
| 1,581,448 | Huetter | Apr. 20, 1926 |
| 2,184,630 | Alexander | Dec. 26, 1939 |
| 2,319,372 | Tilton | May 18, 1943 |
| 1,920,139 | Crosby | July 25, 1933 |
| 923,224 | Welch | June 1, 1909 |
| 2,332,537 | Slatis | Oct. 26, 1943 |

FOREIGN PATENTS

| Number | Country | Date |
|---|---|---|
| 22,153 | British | Oct. 31, 1905 |
| 397,465 | British | Nov. 20, 1931 |
| 24,933 | British | Apr. 11, 1912 |

OTHER REFERENCES

Delmont Plastics in Engineering, Penton Publishing Co., 1940 (copy in Division 15).